United States Patent [19]

Williams et al.

[11] Patent Number: 5,120,927
[45] Date of Patent: Jun. 9, 1992

[54] HIGH TRACK DENSITY MEDIA WITH OPTICAL SERVO TRACKS AND METHOD AND APPARATUS FOR INSCRIBING THE TRACKS ON THE MEDIA

[75] Inventors: Roger O. Williams, Fremont; Milton C. Kurtz, Saratoga; Jimmy D. Godwin, San Jose; Stephen P. Williams, San Jose; Gregory K. Roberts, San Jose, all of Calif.

[73] Assignee: Insite Peripherals, Inc., San Jose, Calif.

[21] Appl. No.: 537,081

[22] Filed: Jun. 12, 1990

Related U.S. Application Data

[62] Division of Ser. No. 202,719, Jun. 3, 1988, Pat. No. 4,961,123.

[51] Int. Cl.⁵ .............................................. B23K 26/00
[52] U.S. Cl. ............................ 219/121.68; 219/121.69; 219/121.82
[58] Field of Search ............... 219/121.68, 121.69, 219/121.82

[56] References Cited

U.S. PATENT DOCUMENTS

| | | |
|---|---|---|
| 4,406,939 | 9/1983 | Golker ........................... 219/121.69 |
| 4,556,524 | 12/1985 | Cullis et al. ........................... 264/1.2 |
| 4,732,844 | 3/1988 | Ota et al. ........................... 430/322 |
| 4,935,835 | 6/1990 | Godwin et al. ........................... 360/135 |
| 4,961,123 | 10/1990 | Williams et al. ........................... 360/131 |

Primary Examiner—C. L. Albritton
Attorney, Agent, or Firm—Thomas E. Schatzel

[57] ABSTRACT

A magnetic information storage medium, such as a floppy or rigid magnetic disk, and an apparatus and method for inscribing a plurality of indelible grooves in a surface of the medium to function as optical servo tracks. The grooves can be in the form of a plurality of continuous or noncontinuous concentric circles. The grooves can also be a continuous spiral or a plurality of continuous concentric circles having non-constant widths and/or depths. The apparatus comprises a platen and drive motor for rotating the medium, an argon ion laser light source for generating a beam of light, optical components for directing the beam of light to a beam focusing carriage and a microcomputer for controlling the apparatus. The method involves rotating the medium under the focused light beam to inscribe the grooves on the surface of the medium. Optical track densities greater than 1000 tracks per inch can be obtained with the method.

42 Claims, 2 Drawing Sheets

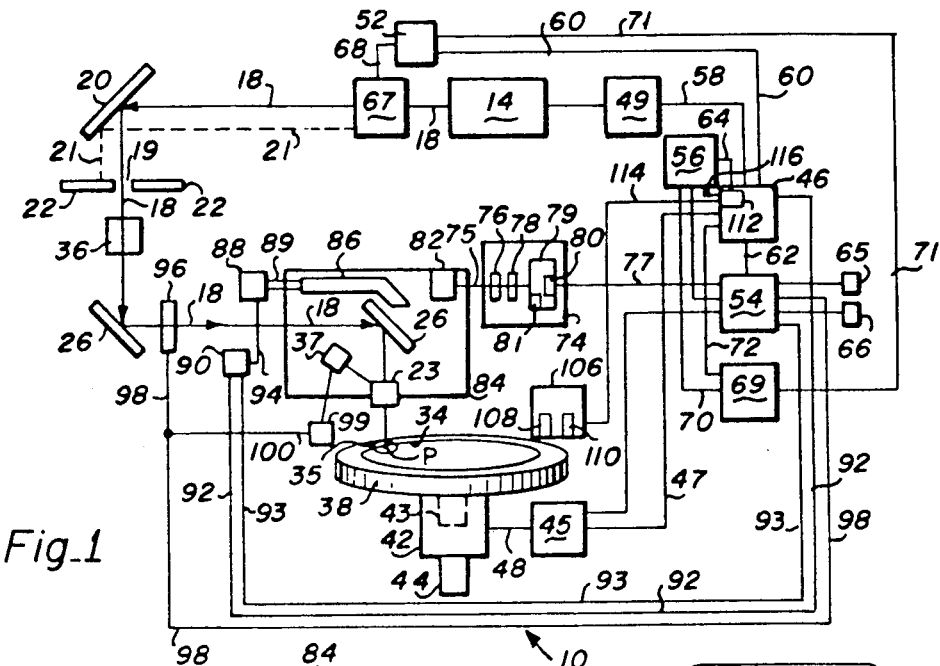
Fig_1
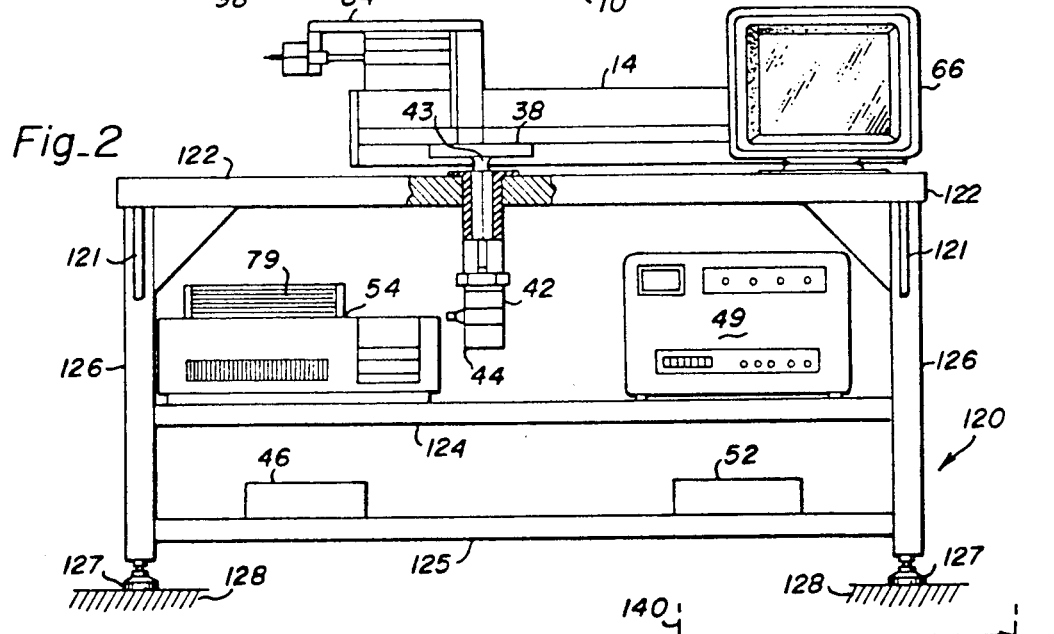
Fig_2
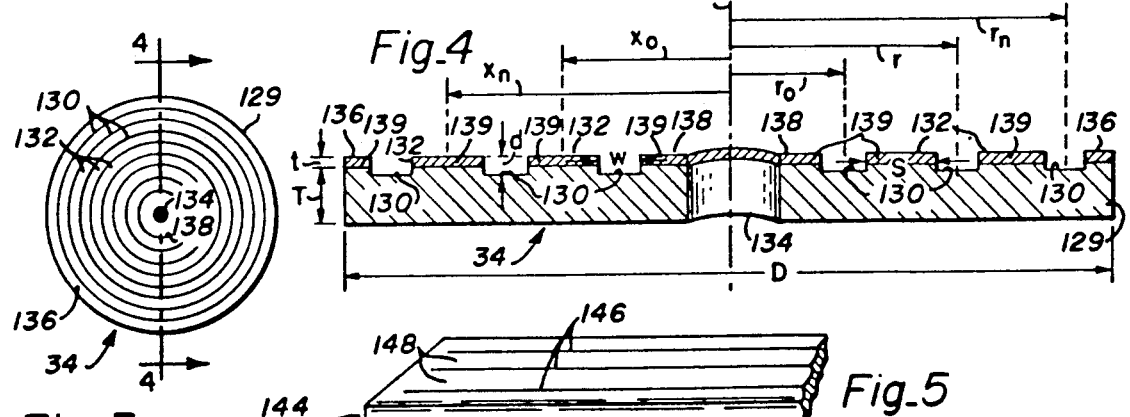
Fig_3   Fig_4   Fig_5

HIGH TRACK DENSITY MEDIA WITH OPTICAL SERVO TRACKS AND METHOD AND APPARATUS FOR INSCRIBING THE TRACKS ON THE MEDIA

This is a divisional of copending application Ser. No. 07/202,719 filed on Jun. 3, 1988 and now U.S. Pat. No. 4,961,123.

BACKGROUND OF THE INVENTION

1. Field of the Invention

The present invention relates to information storage media possessing optical servo tracks and an apparatus and method for inscribing tracks on the media and more particularly to magnetic disk media in which the optical servo tracks comprise a plurality of concentric grooves inscribed in the surface of the disk, e.g. by a laser, while the disk rotates at high speeds.

2. Description of the Prior Art

The track density of magnetic storage disks for conventional floppy disk drives is approximately forty-eight to one hundred thirty-five tracks per inch (TPI). In contrast, optical disk drives are capable of achieving track densities in excess of 15,000 TPI. These higher track densitites are achieved through the use of closed loop optical servos that allow the read/write head to follow data track eccentricities caused by defects in the medium and by disturbances from outside forces. In rigid type magnetic disk drives, track densities of up to 1500 TPI are presently used. These drives commonly have multiple disks in which both sides are used for data. To achieve the high track density a dedicated surface of one of the disks is used for magnetic track servo information. This surface is then not usable for data storage. Thus, the total capacity of the drive is lessened. The tracking servo information is also capable of being accidentally erased causing loss of access to all data.

Various techniques have been reported for using optical means for acquiring track following servo information contained on a magnetic recording medium. For example, Ahn, et al in U.S. Pat. No. 4,633,451, issued on Dec. 30, 1986, for "Optical Servo For Magnetic Disks", disclose the use of a laser diode to read track following servo information in the form of a plurality of spots contained in an optical layer positioned above a magnetic recording layer.

DiStefano, et al, in U.S. Pat. No. 4,570,191, issued on Feb. 11, 1986, for "Optical Sensor for Servo Position Control", disclose a servo sensor comprising a light source and a light detector, axially aligned and contained on a single semiconductor chip.

M. Johnson, in U.S. Pat. No. 4,558,383, issued on Dec. 10, 1985, for "Information Storage Disk Transducer Position Control System Using a Prerecorded Servo Pattern Requiring No Alignment With the Storage Disk", discloses a servo apparatus having a sensor for detecting a pattern of spots on a surface of an information storage medium. The spots comprise a dense array of substantially translation invariant marks and separate information recording tracks are detected by measuring the rate at which the spots are detected by the sensor J. Cocke, et al, in U.S. Pat. No. 4,587,579, issued on May 6, 1986, for "System for Position Detection on a Rotating Disk", disclose a servo control system comprising a detector for reading a plurality of spiral radial-position-encoding patterns on a medium.

A. S. Hoagland in "Optical Servo of Magnetic Recording", IBM Technical Disclosure Bulletin, Vol. 20(10), page 4108 (March 1978), suggests a system for achieving optical servo control where a flexible disk medium includes a plurality of optical servo tracks positioned underneath a magnetic layer.

D. A. Thompson, et al in "Embossed Servo Techniques For Floppy Disks", IERE Conference Proceedings, No. 43, p. 321 (July 1979), suggests the use of embossed marks on flexible magnetic media for obtaining non-magnetic optical or capacitive servo information.

N. Koshino and S. Ogawa in "Optical Method of the Head Positioning in Magnetic Disk Systems", preprint from *IEEE Transactions on Magnetics* (1980), disclose an optical head for achieving track following servo control which is mounted on the head arm and which includes an LED light source and three optical fibers for delivering light to a medium. The medium comprises a plurality of circular optical tracks, dyed black, and located underneath a magnetic film.

Related work has occurred in the laser video disk area, from which optical disks for digital data storage and the audio laser disk (CD) have evolved. Fundamentally, the optical servo information is inscribed and used in the same way for all these disks. A mastering machine is used to format optical information onto a master disk. The master is then replicated to form the actual disk used by the customer. A laser and associated optics are used to acquire the mastered servo information as well as read data from the disk. The data can be inscribed during the mastering process as with the video and audio disks or it can be written by the read/write laser as in disks for digital information storage.

K. D. Broadbent in "A Review of the MCA Disco-Vision System", Journal of the SMPTE (1974), describes the Laser Video mastering technique as well as the servo and read back methods. The mastering machine uses an argon laser to ablate pits in a metallic layer which was deposited on a glass plate. Disks are replicated from the master which contain servo information as well as the video data. A technique for deriving the servo information is described.

The information used for the tracking servo is contained in the laser disks within the features (grooves or pits) that are on the data layer of the disk. The feature causes the reflected light to be modulated in such a way that an error signal can be derived. By the features depth and width being on the order of the wavelength of the laser light, reflected light is modulated by diffraction effects. The effect of diffraction are most pronounced with coherent light as emitted by a laser.

SUMMARY OF THE PRESENT INVENTION

It is therefore an object of the present invention to provide magnetic media containing a plurality of tracks having information that can be detected by optical means and used for track following servoing.

It is another object of the present invention to provide magnetic media containing optical servo tracks that have data track densities greater than approximately 1000 tracks per inch.

It is another object of the present invention to provide an apparatus for inscribing magnetic media with a plurality of high track density optical servo tracks.

It is another object of the present invention to provide a method for inscribing magnetic media with a plurality of high track density optical servo tracks.

It is another object of the present invention to provide a method for inscribing indelible optical servo tracks on standard magnetic media.

It is another object of the present invention to provide a method for inscribing media with optical servo information in which the optical servo information and the magnetic data are not interactive.

It is another object of the present invention to provide a medium on which the tracking servo information is indelible, but the magnetic data can be erased and rewritten.

It is another object of the present invention to provide a medium having tracking servo information that will not be lost as the medium wears.

It is another object of the present invention to provide a method for inscribing tracking servo information on the same surface as data in such a manner that total data capacity is maximized.

Briefly, a preferred embodiment of the present invention comprises a thin cylindrical piece of flexible magnetic substrate, such as a piece of polyethylene terephthalate (Mylar) coated with a magnetic layer on one or both sides (i.e. a floppy disk), in which a plurality of grooves in the form of continuous concentric rings have been inscribed on either one or both of the circular faces of the cylinder. Alternatively, a medium could comprise a metal substrate coated with a magnetic layer on one or both sides. A plurality of noninscribed regions exist on each face of the cylinder with one noninscribed region lying between every two adjacent grooves. Information can be stored on the noninscribed regions while the grooves can be used as optical servo tracks. Typically, the grooves have a width of approximately three microns and a depth of approximately one micron. The spacing between the grooves, which is the width of the noninscribed regions, is approximately seventeen microns. Therefore, on a disk, e.g. a 2 inch, 3.5 inch, 5.25 inch or 8 inch floppy disk, an optical track density equal to or greater than approximately 1,250 tracks per inch can be obtained. The width of a data track on one of the noninscribed regions is generally determined by the width of the gap on the magnetic head. One or more magnetic data tracks can be placed between each pair of optical tracks.

A preferred embodiment of the apparatus for manufacturing the optical servo tracks comprises an ion laser, e.g. a five-watt argon ion laser, for generating a beam of light which passes through an acousto-optic deflector which deflects the beam to an obstruction when the defector is on. A microcomputer, e.g. an IBM PC/AT compatible computer, monitors an encoder on a platen/spindle motor assembly. The platen is driven by a 6000 rpm variable speed spindle motor. The disk to be inscribed with optical tracks is mounted on the platen. When the command is sent to inscribe a track, the deflector is turned off allowing the light beam to pass to several routing mirrors and a beam forming optical system, e.g. a telescope, and then to a mirror/objective lens assembly mounted on a carriage assembly. The beam of light is focused to a small spot on the spinning disk. The energy density of the focused spot of light is such that some of the disk surface is ablated, forming the optical track. After one revolution is sensed, the deflector is turned on thus causing the beam to once again hit the obstruction. The carriage assembly then shifts to a new position so another concentric ring can be inscribed on the medium. A laser interferometer, interfaced to the microcomputer, provides a means for evaluating and correcting the movement of the carriage assembly. The rotational speed of the platen is changed so that the linear velocity at a second burn point will be equal to the linear velocity at the first burn point. Alternatively, the power of the laser could be varied to yield a constant energy density at the burn points.

A focus monitor is mounted in the path of the beam of laser light. Some of the light which hits the disk is reflected back through the objective lens and is redirected to the focus monitor. Small vertical movements of the media and thermal drift of the components which would cause the spot of laser light to be defocused are detected by the monitor. These movements and thermal drift can be compensated by moving the objective lens in the vertical direction. Additionally, the apparatus is mounted on a vibration isolated table which isolates the lens assembly, laser, routing mirrors and spindle assembly from external forces applied to the apparatus and from disturbances within the appratus which would result in inaccuracies of track position on the medium.

An advantage of the present invention is that the cylindrical piece of magnetic media comprises a plurality of grooves in the form of continuous, concentric rings.

Another advantage of the present invention is that the optical tracks have a track density greater than 1000 tracks per inch which allows a data track density of 1000 tracks per inch or greater.

Another advantage of the present invention is that the optical grooves on the magnetic medium can be inscribed by a machine.

Another advantage of the present invention is that the optical grooves on the magnetic medium can be inscribed by using a simple method.

Another advantage of the present invention is that indelible optical servo tracks may be inscribed on standard magnetic media.

Another advantage of the present invention is that the optical servo information and the magnetic data on the medium are not interactive.

Another advantage of the present invention is that the tracking servo information on the medium is indelible but the magnetic data can be erased and rewritten.

Another advantage of the present invention is that the optical grooves will not be lost as the medium wears.

Another advantage of the present invention is that the total data capacity of the medium is maximized while keeping the tracking servo information and the magnetic data on the same surface of the medium.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a block diagram of a servo inscribing machine according to the present invention;

FIG. 2 is a side view of the servo inscribing machine of the present invention;

FIG. 3 is a top view of a cylindrical medium with optical servo tracks in the form of a plurality of continuous grooves arranged in concentric circles according to the present invention;

FIG. 4 is a cross-sectional view of the medium taken along the line 4—4 of FIG. 3;

FIG. 5 is a side elevational view of a strip of magnetic tape with optical servo tracks according to the present invention;

DETAILED DESCRIPTION OF THE PREFERRED EMBODIMENT

Figure 6:
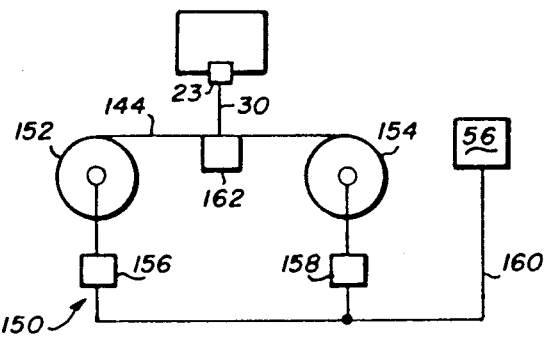
FIG. 6 is a side diagrammatic view of a tape winding system for use with an alternative embodiment of the media inscribing machine of FIG. 1.

Referring now to FIG. 1, there is shown a servo inscribing machine of the present invention designated by the general reference numeral 10.

A laser 14 generates a beam of coherent collimated light 18 which is directed to an aperture 19 by a primary mirror 20. When the path of the beam 18 is altered slightly, an altered beam 21 is produced which strikes a beamstopper 22. The beam 18 is directed to a lens 23 by a plurality of secondary mirrors 26. The lens 23 produces a focused beam 30 which is focused about a point "p" on a surface of a medium 34 as a focused spot 35. The focused spot 35 has a diameter $d_o$ and a power $P_o$. A beam forming optical system 36 can be positioned between the primary mirror 20 and the lens 23 to expand or contract the beam 18 to the proper size for the lens 23. The beam forming optical system 28 can have a telescope configuration so that the beam 18 remains collimated. An actuator 37, such as a piezoelectric stage, can be mechanically connected to the lens 23.

The medium 34 is supported by a platen 38 which is mechanically connected to a motor 42 by a spindle 43. An encoder 44 is mechanically connected to the motor 42. An amplifier 45 is electrically connected to a power supply 46 by a lead 47 and to the motor 42 by a lead 48. The power supply 46 provides all the various power requirements for the servo inscribing machine 10 and may include direct current units, e.g. a 5V dC unit, powered by an alternating current power line. The power supply 46 is electrically connected to a laser power supply 49, to an acoustic optic (AO) deflector 52, to a microcomputer 54 and to an input/output (I/O) interface 56 by a plurality of leads 58, 60, 62 and 64, respectively. A keyboard 65, a terminal 66, the amplifier 45 and the input/output interface 56 are electrically connected to the microcomputer 54. An acoustic optic (AO) deflector 67 is electrically connected to the AO amplifier 52 by a lead 68. A laser synchronization circuit 69 is electrically connected to the input/output interface 56, the AO amplifier 52, and the power supply 46 by a plurality of leads 70, 71 and 72, respectively. A laser interferometer 74 directs a beam of coherent light 75 thru a remote interferometer 76. A lead 77 electrically connects the laser interferometer 74 to the computer 54. The laser interferometer 74 is a standard component which comprises a stabilized laser 78 and a power supply/controller unit 79. The power supply/controller unit 79 includes an RS232 communications interface 80 and an A/B quadrature output 81 for step motor encoder inputs. The beam of coherent light is directed from the laser 78 thru the remote interferometer 76 and to a retroreflector 82.

The lens 23 is an element of a carriage assembly 84 which also includes the retroreflector 82, one of the mirrors 26 and a slider 86. The slider 86 can be, for example, a cross-roller bearing slide assembly or an air bearing slide. A stepper motor 88 is mechanically connected to precision lead screw 89 which is mechanically connected to the slider 86. An amplifier 90 is electrically connected to the power supply 46 and to the computer 54 by a pair of leads 92 and 93, and to the stepper motor 88 by a lead 94. A focus monitor 96 is located between one of the mirrors 26 and the carriage assembly 84 and is electrically connected to the microcomputer 54 by a lead 98 and to a power amplifier 99 by a lead 100.

A debris evacuation system 106, which includes a blower unit 108 and a vacuum unit 110, located near the platen 38, is electrically connected to a control relay 112 included in the power supply 46 by a lead 114. An electrical lead 116 connects the relay 112 to the I/O interface 56. The debris evacuation system 106 may also include a high potential electrostatic field.

FIG. 2 shows the servo inscribing machine 10 mounted on a standard vibration isolated table designated by the general numeral 120. The table 120 comprises a plurality of vibration absorbing joints 121, a first platform 122, a second platform 124 and a third platform 125 supported by a plurality of vertical members 126. The vertical members 126 are supported by a plurality of feet 127 which are in contact with a floor 128. Generally, vibration causing or auxilliary components, such as the laser power supply 49 and the microcomputer 54 are positioned on the second platform 124 or the third platform 125 while the major components such as the laser 14, the carriage assembly 84 and the platen 38 are positioned on the first platform 122.

FIG. 3 shows the preferred embodiment of the medium 34. In the preferred embodiment, the medium 34 comprises a thin, flexible, cylindrically shaped piece of substrate 129 (e.g., a polyethylene terephthalate (Mylar) disk substrate) coated with a magnetic layer on one or both sides, an embodiment generally referred to as a floppy disk. A plurality of grooves 130, which appear as a plurality of equally spaced, concentric circles, are inscribed in the surface of substrate 129. A plurality of noninscribed regions 132 exist on the surface of the substrate 129 with one of the noninscribed regions 132 existing between every two adjacent grooves 130. The grooves 130 may be inscribed on one face of the substrate 129 or they may be inscribed on both faces. A hole 134 exists in the approximate center of the substrate 129 and extends perpendicularly through the substrate 129. An outer ring 136 and an inner ring 138 also exist on the surface of the substrate 129. The outer ring 136 comprises a ring which circumscribes the groove 130 having the largest radial distance from the geometric center of the substrate 129. The inner ring 138 circumscribes the hole 134 and is circumscribed by the groove 130 having the smallest radial distance from the geometric center of the substrate 129. The medium 34 having the groove/noninscribed ring configuration just described will have n number of the grooves 130 on one face and n-1 number of the noninscribed regions 132.

In alternative embodiments, the medium 34 could be any cylindrically shaped magnetic medium capable of having grooves inscribed on either or both of its faces. For example, the medium 34 could be a cylindrical piece of rigid magnetic medium, such as a metal substrate coated with a magnetic layer one or both sides, an embodiment generally referred to as a hard disk.

FIG. 4 shows a cross-sectional view of the medium 34 with the grooves 130 appearing on only one face of the medium 129. The grooves 130 have a width w and a depth d. The noninscribed regions 132 have a width s which represents the spacing between the grooves 130. The substrate 129 has a thickness T. A magnetic coating 139 is located on the surface of the substrate 129 and has a thickness t. The groove 130 are indelible. In other words, once the grooves 130 are inscribed on the surface of the substrate 129, they cannot be removed or altered. It should also be noted that the depth d does not have to be well defined as shown in FIG. 4. In some situations, it would be adequate if the surface of the substrate 129 were only "charred" so as to create a region of optical contrast between the charred and uncharred regions.

The grooves 130 comprise a plurality of continuous concentric rings with each ring having a radius r measured from an axis 140, which is coincident with the geometric center of the cylindrical piece of magnetic medium 129, to the center of the groove 130. The radius corresponding to the outermost groove 130 is designated as $r_n$ and the radius corresponding to the innermost groove 130 is designated as $r_o$. Similarly, the noninscribed regions 132 comprise a plurality of continuous concentric rings with each ring having a radius x measured from the axis 140 to the center of the noninscribed region 132. The largest radius value for noninscribed regions is designated as $x_n$ and the smallest value of x is designated as $x_o$.

In the preferred embodiment, the spacing s is approximately seventeen microns (0.00067 inches), the width w is approximately three microns (0.00012 inches) and the depth d is approximately one micron (0.00004 inches). The thickness T of the medium 129 can range from approximately 0.002 inches to 0.003 inches. In the preferred embodiment the thickness t of the magnetic coating 139 is approximately one to two microns thick on, for example, a disk with a diameter D of 3.5 inches. For disks with diameters D of 5.25 or 8 inches, the thickness t of the magnetic coating 139 could range from approximately one to three microns. It should be noted that the values stated for the diameter D are only given for illustrative purposes and the actual value is immaterial to the present invention. Numbers such as 3.5 inches or 5.25 inches used in conjunction with magnetic media actually refer to the generic size of the media. Typically, it is the medium container that has the dimension of 3.5 or 5.25 inches and the medium itself has a slightly smaller dimension so that it will fit within the container.

FIG. 5 shows a thin rectangular strip of magnetic tape designated by the general reference numeral 144. The tape 144 can be used as the medium 34 in FIG. 1. A plurality of longitudinal grooves 146 and a plurality of longitudinal noninscribed areas 148, analogous to the grooves 130 and the noninscribed regions 132, exist on the surface of the tape 144.

FIG. 6 shows a portion of an alternative embodiment of the servo inscribing machine 10 in which the platen 38 and the motor 42 have been replaced by a spooling device 150 for inscribing the magnetic tape 144 shown in FIG. 5. The tape 144 is contained on a feeder reel 152 and a take-up reel 154. A pair of motors 156 and 158 drive the reels 152 and 154, respectively, and are electrically connected to the input/output interface 56 by a lead 160. A flat surface 162 supports the tape 144 in the region where the beam 30 strikes the tape 144.

Figure 7:
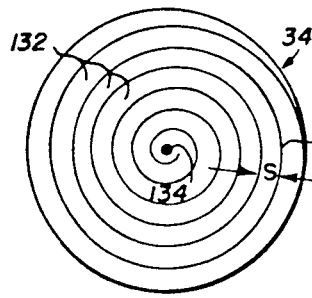
FIG. 7 is a top view of a cylindrical medium with optical servo tracks in the form of a continuous spiral according to the present invention.

FIG. 7 shows an alternative form of the medium 34 in which the groove 130 comprises a single continuous spiral pattern 164. The plurality of nonreflective areas 132, having an approximate width s as in FIG. 4, exist between adjacent groove regions of the spiral pattern 164.

Figure 8:
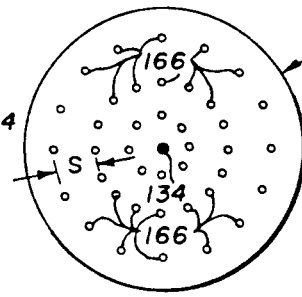
FIG. 8 is a top view of a cylindrical medium with optical servo tracks in the form of a plurality of pits arranged in concentric circles according to the present invention.

FIG. 8 shows an alternative form of the medium 34 in which the grooves 130 comprise a plurality of pits 166 which are approximately circular in form. The pits 166 are arranged in evenly spaced concentric rings having the spacing s as in FIG. 4.

Figure 9:
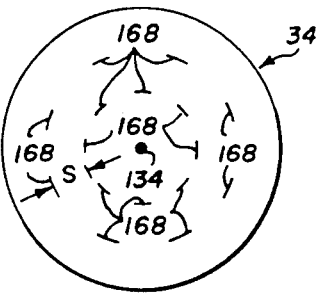
FIG. 9 is a top view of a cylindrical medium with optical servo tracks in the form of a plurality of noncontinuous grooves arranged in concentric circles according to the present invention.

FIG. 9 shows another alternative form of the medium 34 in which the grooves 130 comprise a plurality of noncontinuous grooves 168 arranged in concentric rings having the spacing s as in FIG. 4.

Figure 10:
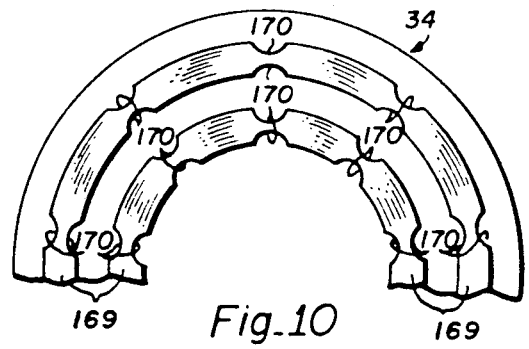
FIG. 10 is a partial top view of a cylindrical medium containing optical servo tracks in the form of a plurality of modulated continuous grooves arranged in concentric circles according to the present invention.

FIG. 10 shows a portion of another alternative form of the medium 34 in which the grooves 130 comprise a plurality of modulated grooves 169. The modulated grooves 169 are similar to the grooves 130 shown in FIG. 4, but the width "w" and/or the depth "d" change at a plurality of modulation points 170. Information can be encoded into the grooves 169 by exploiting the location of the modulation points 170. For example, in the preferred embodiment, the modulation points 170 occur at regular intervals and could be used to generate a clock. Similarly, other types of information such as track servoing information or track seeking information could be encoded in the modulated grooves 169.

Figure 11:
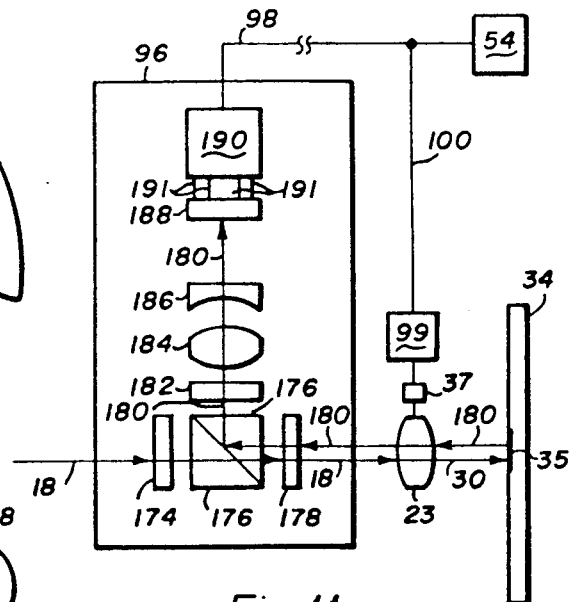
FIG. 11 is a block diagram of an astigmatic focus control for use with the present invention.

FIG. 11 shows the components of a commonly available astigmatic focus control which could function as the focus monitor 96. The beam 18 passes through a half wave phase retardation plate 174, a polarization beam splitter 176 and a quarter wave phase retardation plate 178, and impinges on the lens 23 which forms the focused beam 30 and the focused spot 35. Some of the focused beam 30 is reflected off the medium 34 as a reflected beam 180 which is retrodirected back through the lens 23 and the quarter wave plate 178. The polarization beam splitter deflects the reflected beam 180 so that it passes through an attenuator 182, a converging lens 184 and a cylindrical lens 186. The reflected beam 180 then impinges on a four quadrant photodetector 188 which is electrically connected to a servo amplifier 190 by a plurality of output leads 191. The amplifier 190 is electrically connected to the microcomputer 54 by the lead 98. The power amplifier 99 is electrically connected between the actuator 37 and the microcomputer 54.

Figure 12:
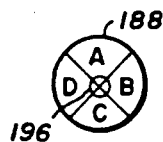
FIG. 12 shows an in-focus laser spot projected on a four quadrant photodetector.

FIG. 12 shows an in-focus image 196 of the reflected beam 180 projected on the four quadrant photodetector 188.

Figure 13:
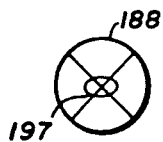
FIG. 13 shows an out-of-focus laser spot elongated along a horizontal axis projected on a four quadrant photodetector.

FIG. 13 shows an out-of-focus image 197 of reflected beam 180 which is elongated along a horizontal axis.

Figure 14:
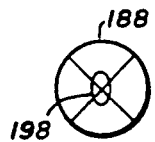
FIG. 14 shows an out-of-focus laser spot elongated along a vertical axis projected on a four quadrant photodetector.

FIG. 14 shows an out-of-focus image 198 of reflected beam 180 elongated along a vertical axis.

Referring now to FIG. 1, the method of operation of the media inscribing machine 10 can be explained. The medium 34 lies on the platen 38 which is rotated by the motor 42. The platen 38, which can be comprised of stainless steel, should preferrably be substantially flat with a surface finish of approximately two to four microinches and substantially free of vertical movement. This will ensure that the medium 34 will be rotated in a horizontal plane. The motor 42 can be a variable rotational speed motor capable of attaining 0 to 3600 rpm in two seconds or less and capable of attaining 0 to 6000 rpm in ten seconds or less with a forty pound/inch inertial load capacity.

The motor 42 is powered by the amplifier 45 which can be a 110V A.C. single phase amplifier with a ±10V input velocity control.

The laser 14, which can be a five watt argon ion laser, emits the beam of light 18. With an argon laser, the beam 18 has a wavelength of 488.0 or 514.5 nm. When the acoustic optic deflector 67 is deactivated, the beam 18 passes through the aperture 19 and is directed to the lens 23 by the plurality of secondary mirrors 26. The mirrors 20 and 26 are optically tuned for the wavelength of radiation generated by the laser 14 and are thus highly reflective for the beam 18. The lens 23 focuses the beam 18 and produces the focused beam 30. The focused beam 30 is focused about the point p substantially perpendicular to the surface of the medium 34 and produces the focused spot 35 having the diameter $d_o$ and the power $P_o$. The lens 23 provides a total depth of focus at the surface of medium 34 of approximately six microns. The power of the laser 14 is adequate to yield the power $P_o$ of at least approximately 0.25 watts at the focused spot 35 on the surface of the medium 34. $P_o$ can be varied by changing the power out of the laser 14, for example, by varying the current going into the laser at the laser power supply 49. By rotating the medium 34 at a constant linear velocity, a constant amount of power per unit area is delivered to the medium 34. The interaction of the focused beam 30 with the rotating surface of the medium 34 creates the groove 130.

The debris evacuation system 106 functions to remove debris generated by the heating of the medium 34 at the point P by the beam 30. The blower unit 108 generates a stream of clean pressurized gas which can be nitrogen, for example, which blows across the surface of the medium 34. The vacuum unit 110, which is generally located distally to the blower unit 108, operates at a negative pressure and sucks in debris propelled by the pressurized stream of gas. A high potential AC electrostatic field can be used in conjunction with the debris evacuation system 106 to collect debris for more efficient removal by the blower unit 108 and the vacuum unit 110.

The microcomputer 54 initiates the groove inscription process by activating the laser synchronization circuit 69. The encoder 44 sends a signal to the laser synchronization circuit 69 indicating that a revolution of the platen 38 is beginning. The circuit 69 deactivates the acoustic optic deflector 52 which allows the beam 18 to pass through the aperture 19 to lens 23. The encoder 44 indicates when a predetermined number of revolutions of the platen 38 have occurred. For example, the predetermined number may be one or more complete revolutions or it may be a fraction of a revolution. One revolution of the platen 38 creates one of the continuous circular grooves 130 having a first radius $r_1$. Before inscribing a new circular groove 130, having a second radius $r_2$, the beam 30 must be deflected from the medium 34 and the lens 23 must be moved an incremental amount to a new position. To initiate this process, the encoder 44 sends a signal to the laser synchronization circuit 69 indicating that one revolution has been completed. The laser synchronization circuit 69 activates the acoustic optic deflector 67 which shifts the path of the beam 18 recreating the altered beam 21 which strikes the beamstopper 22. Because the altered beam 21 is not directed to the lens 23 under these conditions, there is no beam 30 to strike the medium 34.

Simultaneous with the deflection of the beam 18, the microcomputer 54 activates the amplifier 90 which causes the stepper motor 88 to move the carriage assembly 84 an incremental amount. The lens 23 and one of the mirrors 26 move with the carriage assembly 84 because they are physically attached to it. Incremental movement (on the order of one microinch) of the carriage assembly 84 is accomplished by the precision lead screw 89, having forty turns per inch, attached to the slider 86 and being driven by the stepper motor 88 operating at 25,000 steps per revolution. The laser interferometer 74, the remote interferometer 76, and the retroreflector 82 function in combination to evaluate the actual distance that the carriage assembly 84 has moved. Information on the actual movement of the assembly 84 is conveyed to the microcomputer 54 via the lead 77 so that further movement of the carriage assembly 84 can be initiated.

Once the carriage assembly 84 has been moved to its new position, the new circular groove 130 having the radius $r_2$ can be inscribed. Generally, the grooves 130 are inscribed in the order of largest to smallest radius. The amount of the incremental movement of the carriage assembly 84 will correspond to the spacing s and the width w. The depth d and width w of a particular groove 130 is a function of the energy density delivered by the beam 30. In order to achieve a constant depth d and width w for the grooves 130, the medium 34 must move under the lens 23 with a constant linear velocity. As indicated by equation 1 below, linear velocity, $V_L$, is a function of the groove radius r. The spin velocity "b" is in revolutions per minute (rpm).

$$V_L = 2\pi r \times b \quad (1)$$

The energy, ED, of the focused beam 30 is proportional to the power, $P_o$, within the focused spot 35 divided by the spot diameter, $d_o$, multipled by the linear velocity $V_L$ as shown in equation 2.

$$ED \propto \frac{P_o}{d_o V_L} \quad (2)$$

By varying the rotational speed (rpm) of the motor 42, a constant linear velocity can be achieved despite the changing groove radius r, thus resulting in a constant energy density being delivered to the medium 34.

Another important factor in controlling the uniformity of the grooves 130 is the vertical movement of the medium 34. This vertical movement is primarily reduced by restricting the vertical movement of the platen 38 and ensuring the flatness of the platen 38. As an added measure, the focus monitor 96 can be utilized to keep the beam 30 focused on the point p by moving the lens 22 up and down as the surface of the medium 34 fluctuates. The focus monitor 96 functions by causing a change in voltage which is proportional to a change in the vertical position of the medium 34. The voltage change can be produced with a common focus error detection technique such as the astigmatic focus error method shown in FIG. 11. Light reflected from the medium 34 as the reflected beam 180 is collected by the lens 23 and retrodirected back through the quarter wave plate 178 which converts the polarization of the beam 180 from circular to linear polarization. Since the plane of polarization has been rotated ninety degrees, the beamsplitter 176 diverts the reflected beam 180 to the four quadrant photodetector 188. The presence of the converging lens 184 and the cylindrical lens 186 focuses and astigmatizes the beam 180 into a spot whose intensity distribution is non-uniform in the tangential and saggital axes of the beam 180 on the far side or near side of the ideal focus point of lens 23. The attenuator 182 is placed between the polarization beamsplitter 176 and the converging lens 184 to lower the beam power to within the dynamic range of the detector 188.

The astigmatic spot is imaged onto the four quadrant photodetector 188 as shown in FIG. 12. The output leads 191 of the photodetector 188 are connected to the servo amplifier 190 such that each two opposite segments of the photodetector are added and the resultant signal from each pair are subtracted to obtain an error signal (ES) as shown in equation 3.

$$ES = (A + C) - (B + D) \quad (3)$$

The error signal is amplified by the amplifier 99 and used to power the actuator 37, which could be a piezoelectric transducer. The actuator 37 moves the lens 23 up and down in a plane parallel to the axis of the beam 18. As the medium 34 moves in the vertical direction, the movement is detected and the beam 30 is refocused by moving the lens 23 up or down relative to the medium 34.

In the preferred embodiment, the focus monitor 96 is used once at the beginning of the inscribing of each disk. Alternatively, it could be used continuously as the disk is inscribed.

Another method of reducing vertical (and horizontal) movement of the medium 34, is to mount the servo inscribing machine 10 on the vibration isolated table 120. The vibration isolated table functions to reduce vibration by isolating the lens 23, the laser 14, the mirrors 20 and 26 and the platen 38 from external forces and from disturbances generated within the machine 10.

The microcomputer 54 can be an IBM PC/AT compatible type computer and a basic program, e.g. Borland's Turbo Basic or Microsoft Basic, can be utilized to control the overall functioning of the servo inscribing machine 10. The input/output (I/O) interface 56 is electrically connected to microcomputer 54 and provides an interface for connecting circuits such as the laser synchronization circuit 69 to the microcomputer 54. The interface 56 comprises a serial port RS-232 interface board and an I/O interface with solid state relays that control the air valves for the blower unit 108 and the vacuum unit 110. The power supply 46 provides power for the microcomputer 54, the laser 14, the amplifiers 45 and 90 and elements connected to the interface 56. The control relay 112 in the power supply 46 provides control of the vacuum power.

The servo inscribing machine 10 can also be used to inscribe grooves on media having shapes other than the cylindrical structure of the medium 129. For example, FIG. 5 shows a section of the long thin rectangular strip of magnetic tape 144. The longitudinal grooves 146 are inscribed on the tape 144 by using the microcomputer 54 and the input/output interface 56 to control the motors 156 and 158 shown in FIG. 6. As the tape 144 moves past the flat surface 162, the beam 130 inscribes the groove 146. At the end of the reel, the beam 30 is temporarily deflected, the carriage assembly steps to a new position and the tape is inscribed in reverse The spiral pattern 164 shown in FIG. 7 is inscribed by setting the motor 42 to spin at a constant velocity, e.g. 3600 rpm, while changing the laser output power. The carriage assembly 84 is placed into a constant step rate motion of 48000 steps per second resulting in the spiral track spacing of 800 microinch at 3600 rpm. This changes the radial position of the beam 30 and the point p at a constant rate. An index pulse from the encoder 44 is used by the laser synchronization circuit 69 to enable the laser 14 to the surface of the disk. Each subsequent index pulse is counted until a total of, for example, 840 revolutions is reached. At that point, the index pulse causes the laser beam 30 synchronization circuit 69 to remove the laser from the disk.

In general, the proper step rate (SR), in steps per second, can be calculated from equation 4 below where the pitch equals the distance "s" plus "w" from FIG. 4, one step equals one microinch, and "b" is the spin velocity in rpm.

$$SR = pitch \times b/60 \quad (4)$$

Examination of equation 4 shows that the spiral pattern 164 is actually a "step" pattern which approximates a spiral.

The pits 166 shown in FIG. 8 are inscribed by setting the spindle motor 42 to spin at a constant velocity of, for example, 3600 rpm. The carriage assembly 84 is moved to the track 0 position and a command is issued to begin a track write. At index, the logic in the laser synchronization circuit 69 begins to issue a pulse train to the A/0 deflector 67 that is phase locked to the sector pulses from the encoder 44. This causes the beam 30 to be directed at the medium 34 for short periods of time, thus forming the pits 166. At the next index pulse the track is complete and the carriage is moved to the next track and the laser power is lowered.

The noncontinuous grooves 168 shown in FIG. 9 are inscribed by a process similar to that used for inscribing the pits 166. The only difference is that the length of time the beam 30 is directed at the medium 34 is increased for inscribing the grooves 168.

The modulated grooves 169 shown in FIG. 10 are inscribed by a process similar to that used for inscribing the pits 166 and the noncontinuous grooves 168 shown in FIGS. 8 and 9, respectively. However, instead of the beam 30 being deflected away from the medium 34 for short periods of time, the power within the beam 30 is changed during the appropriate time interval. This causes a change of energy at the point "p" on the surface of the medium 34 which causes the groove width and depth to change at the modulation points 170. The modulation points 170 can carry encoded information.

Similarly, the pits 166 in FIG. 8 or the noncontinuous grooves 168 in FIG. 9 could carry encoded information by causing width or depth variations in the pits 166 or in the grooves 168.

Other types of cylindrical media that can be used as the medium 34 in FIG. 1 include floppy disks of other generic sizes (e.g. 2, 5.25 inch and 8 inch) and rigid magnetic disks of various generic sizes (e.g. 2, 3.5, 5.25, 8 and 14 inch).

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. An apparatus for inscribing a plurality of grooves on a surface of a magnetic medium which comprises:
   a light source for providing a beam of light to inscribe a surface of a magnetic medium;
   means for focusing said beam of light on said surface of said magnetic medium, the focusing means having a focus monitor for refocusing said beam of light in response to movement of said magnetic medium;
   means for varying the position of said beam of light relative to a point on said surface of said magnetic medium; and
   automatic control means electrically connected to the means for varying the position of said beam of light, the automatic control means functioning to send positional information to the means for varying the position of said beam of light, such that the inscribing of said magnetic medium by said beam of light can be controlled by said automatic control means.

2. The apparatus of claim 1 wherein, the means for focusing said beam of light comprises a lens.

3. The apparatus of claim 1 wherein, the focus monitor comprises an astigmatic focus control.

4. The apparatus of claim 1 further comprising: means for changing the size of said beam of light, positioned between the light source and the means for focusing said beam of light.

5. The apparatus of claim 4 wherein said means for changing the size of said beam of light comprises a telescope.

6. The apparatus of claim 1 further comprising: means for directing said beam of light to the means for focusing said beam of light.

7. The apparatus of claim 6 wherein, the means for directing said beam of light to the means for focusing said beam comprises mirrors capable of reflecting said beam of light.

8. The apparatus of claim 1 further comprising: means for moving said magnetic medium.

9. The apparatus of claim 8 wherein said means for moving said magnetic medium comprises:
   a platen for supporting said magnetic medium;
   a motor coupled to the platen for causing the platen to rotate in a circular direction; and
   an encoder connected with the platen to detect when a predetermined number of revolutions of the platen have occurred.

10. The apparatus of claim 8 wherein said means for moving said magnetic medium comprises:
    a plurality of spindles for accepting said magnetic medium; and
    at least one motor for driving at least one of the spindles, the motor having an electrical connection for receiving signals initiated by the automatic control means.

11. The apparatus of claim 1 wherein said means for varying the position of said beam of light comprises:
    a slide assembly;
    a precision lead screw, mechanically attached to the slide assembly; and
    a stepper motor movably attached to the precision lead screw and functioning to move the lead screw and the slide assembly in discrete steps.

12. The apparatus of claim 1 wherein, said light source comprises a laser.

13. The apparatus of claim 1 wherein, said laser comprises an argon ion laser.

14. The apparatus of claim 1 further including: means for deflecting said beam of light from the means for focusing said beam of light.

15. The apparatus of claim 14 wherein the means for deflecting said beam of light comprises:
    a beam stopper having an aperture therein, said aperture permitting the passing of said beam of light; and
    an acoustic optic deflector for directing said beam of light to said aperture in response to a signal initiated by the automatic control means.

16. The apparatus of claim 1 further comprising: means for evacuating debris from the vicinity of said magnetic medium.

17. The apparatus of claim 16 wherein said means for evacuating debris comprises:
    a blower providing a flow of clean, pressurized gas across the face of said magnetic medium for dislodging a plurality of debris; and
    a vacuum functioning to collect the plurality of debris dislodged by said flow of gas.

18. The apparatus of claim 17 further including: means for generating a high potential electrostatic field.

19. The apparatus of claim 1 wherein the automatic control means comprises a microcomputer.

20. The apparatus of claim 19 further including an interface board including an RS232 serial port.

21. The apparatus of claim 9 wherein, said magnetic medium comprises a thin cylindrical piece cf a flexible magnetic medium.

22. The apparatus of claim 9 wherein, said magnetic medium comprises a thin cylindrical piece of a rigid magnetic medium.

23. The apparatus of claim 10 wherein, said magnetic medium comprises a long thin rectangular piece of flexible magnetic medium.

24. A method for inscribing a plurality of grooves on a surface of a magnetic medium which comprises:
    a. focusing a beam of light about a first point on a surface of a magnetic medium;
    b. changing the relative position of the first point and the beam of light at a first constant velocity with the beam of light imparting a constant energy density to said surface of the medium;

c. deflecting the beam of light away from said surface of the medium when a predetermined travel distance of the medium has occurred;

d. ensuring that the beam of light will impart said constant energy density to the medium at a second point on said surface of the medium;

e. focusing the beam of light about said second point on said surface of the medium; and f. deflecting the beam of light away from said surface of the medium when said predetermined travel distance of the medium has occurred.

25. The method of claim 24 wherein, the medium is circular in shape with a geometric center point and with said predetermined travel distance being a predetermined number of rotations.

26. The method of claim 25 wherein, the first point and the second point are equidistant from the geometric center point.

27. The method of claim 25 wherein, the first point and the second point are not equidistant from the geometric center point.

28. The method of claim 24 wherein, the grooves have a depth of approximately one micron.

29. The method of claim 24 wherein, the grooves have a depth less than one micron but which is sufficient to alter the optical contrast of said surface of the medium.

30. The method of claim 27 wherein, said constant energy density is ensured by rotating the medium at a second constant velocity different from said first constant velocity.

31. The method of claim 27 wherein, said constant energy density is ensured by changing the power of the beam of light.

32. The method of claim 24 further comprising:

a. refocusing the beam of light automatically when the surface of the medium moves in a vertical direction.

33. The method of claim 24 wherein, the medium is a thin cylindrical piece of flexible magnetic medium.

34. The method of claim 24 wherein, the medium is a cylindrical piece of a rigid magnetic medium.

35. A method for inscribing a spiral groove on a surface of a magnetic medium which comprises a. focusing a beam of light about a first point on a surface of a magnetic medium;

b. changing the relative position of said first point and the beam of light at a first constant rotational velocity with the beam of light imparting a constant energy density to said surface of the medium;

c. changing the relative radial position of the first point and the beam of light at a constant rate;

d. ensuring that the beam of light will impart said constant energy density to said medium as the relative radial position of said first point and the beam of light changes; and e. deflecting the beam of light away from said surface of the medium when a predetermined number of rotations of the medium have occurred.

36. A method for inscribing a plurality of modulated grooves on a surface of a magnetic medium which comprises:

a. focusing a beam of light about a first point on a surface of a magnetic medium;

b. changing the relative position of the first point and the beam of light at a first constant rotational velocity with the beam of light imparting a first energy density to said surface of the medium;

c. changing said first energy density to a second energy density when a first predetermined number of rotations of the medium have occurred;

d. changing said second energy density to a third energy density when a second predetermined number of rotations of the medium have occurred;

e. deflecting the beam of light away from said surface of the medium when a third predetermined number of rotations of the medium have occurred;

f. ensuring that the beam of light will impart said first energy density to the medium at a second point on said surface of the medium; and g. focusing the beam of light about said second point on said surface of the medium and repeating steps c-e.

37. The method of claim 36 wherein, said third energy density equals said first energy density.

38. An apparatus for inscribing a plurality of grooves on a surface of a magnetic medium which comprises:

a light source for providing a beam of light to inscribe the surface of the magnetic medium;

means for focusing said beam of light on the surface of the magnetic medium;

means for varying the position of said beam of light relative to a point on the surface of the magnetic medium;

automatic control means electrically connected to the means for varying the position of said beam of light, the automatic control means functioning to send positional information to the means for varying the position of said beam of light, such that the inscribing of the magnetic medium by said beam of light can be controlled by said automatic control means; and means for changing the size of said beam of light, positioned between the light source and the means for focusing said beam of light, the means for changing the size of said beam of light comprises a telescope.

39. An apparatus for inscribing a plurality of grooves on a surface of a magnetic medium which comprises:

a light source for providing a beam of light to inscribe the surface of the magnetic medium;

means for focusing said beam of light on the surface of the magnetic medium;

means for varying the position of said beam of light relative to a point on the surface of the magnetic medium;

automatic control means electrically connected to the means for varying the position of said beam of light, the automatic control means functioning to send positional information to the means for varying the position of said beam of light, such that the inscribing of the magnetic medium by said beam of light can be controlled by said automatic control means; and means for moving the magnetic medium, the means for moving comprises a plurality of spindles for accepting the magnetic medium and at least one motor for driving at least one of the spindles, the motor having an electrical connection for receiving signals initiated by the automatic control means.

40. An apparatus for inscribing a plurality of grooves on a surface of a magnetic medium which comprises:

a light source for providing a beam of light to inscribe a surface of the magnetic medium;

means for focusing said beam of light on the surface of the magnetic medium;

means for varying the position of said beam of light relative to a point on the surface of the magnetic medium, the position varying means comprises a slide assembly, a precision lead screw that is mechanically attached to the slide assembly, and a stepper motor moveably attached to the precision lead screw and functioning to move the lead screw and the slide assembly in discrete steps; and automatic control means electrically connected to the means for varying the position of said beam of light, the automatic control means functioning to send positional information to the means for varying the position of said beam of light, such that the inscribing of the magnetic medium by said beam of light can be controlled by said automatic control means.

41. An apparatus for inscribing a plurality of grooves on a surface of a magnetic medium which comprises:

a light source for providing a beam of light to inscribe a surface of the magnetic medium;

means for focusing said beam of light on the surface of the magnetic medium;

means for varying the position of said beam of light relative to a point on the surface of the magnetic medium;

automatic control means electrically connected to the means for varying the position of said beam of light, the automatic control means functioning to send positional information to the means for varying the position of said beam of light, such that the inscribing of the magnetic medium by said beam of light can be controlled by said automatic control means; and means for deflecting said beam of light from the means for focusing said beam of light.

42. An apparatus for inscribing a plurality of grooves on a surface of a magnetic medium which comprises:

a light source for providing a beam of light to inscribe the surface of the magnetic medium;

means for focusing said beam of light on the surface of the magnetic medium;

means for varying the position of said beam of light relative to a point on the surface of the magnetic medium; and automatic control means electrically connected to the means for varying the position of said beam of light, the automatic control means functioning to send positional information to the means for varying the position of said beam of light, such that the inscribing of the magnetic medium by said beam of light can be controlled by said automatic control means, the automatic control means comprises a microcomputer and an interface board having an RS-232 serial port.

* * * * *